United States Patent [19]

Pfefferle

[11] Patent Number: 4,864,811
[45] Date of Patent: Sep. 12, 1989

[54] METHOD FOR DESTROYING HAZARDOUS ORGANICS

[76] Inventor: William C. Pfefferle, 51 Woodland Dr., Middletown, N.J. 07748

[21] Appl. No.: 98,785

[22] Filed: Sep. 21, 1987

[51] Int. Cl.[4] .......................... F02C 3/14; F02C 3/20
[52] U.S. Cl. ...................................... 60/39.06; 60/723
[58] Field of Search ............... 60/39.02, 723, 39.822, 60/301, 39.06; 431/7

[56] References Cited

U.S. PATENT DOCUMENTS

| | | | |
|---|---|---|---|
| 3,846,979 | 11/1974 | Pfefferle | 60/723 |
| 3,928,961 | 12/1975 | Pfefferle | 60/39.06 |
| 3,940,923 | 3/1976 | Pfefferle | 60/723 |
| 3,975,900 | 8/1976 | Pfefferle | 60/723 |
| 4,019,316 | 4/1977 | Pfefferle | 60/723 |
| 4,065,917 | 1/1978 | Pfefferle | 60/723 |

Primary Examiner—Louis J. Casaregola
Attorney, Agent, or Firm—Kane, Dalsimer, Sullivan, Kurucz, Levy, Eisele and Richard

[57] ABSTRACT

The present invention provides a method for the destruction of hazardous carbonaceous wastes by the plug flow, thermal combustion of said wastes comprising (a) obtaining an intimate admixture of vaporized fuel and air, said admixture containing at least a stoichiometric amount of air, (b) passing said admixture to a plug flow combustion zone, and (c) effecting sustained and essentially complete combustion of said fuel under essentially adiabatic conditions to destroy said wastes and to form a combustion effluent of high thermal energy; said combustion being characterized by said fuel-air admixture having an adiabatic flame temperature such that that actual flame temperature in the combustion zone is greater than about 1350K.

6 Claims, 2 Drawing Sheets

4,864,811

METHOD FOR DESTROYING HAZARDOUS ORGANICS

BACKGROUND OF THE INVENTION

This invention relates to a method and apparatus for the destruction of carbonaceous wastes. More specifically, this invention relates to plug flow gas phase combustion of an intimate admixture or carbonaceous waste with air.

In one still more specific aspect, this invention relates to the high velocity plug flow gas phase combustion of a gas phase admixture of hazardous organics with air at elevated pressure and with recovery of useful work.

BRIEF DESCRIPTION OF THE PRIOR ART

The disposal of liquid organic hazardous and toxic wastes and fumes thereof is a pressing modern day problem. Although recycling of materials and improvements in chemical plant process efficiency can and has reduced the amount of wastes produced, the amount of harzardous/toxic wastes to be disposed of is a major problem yet to be satisfactorily deal with. In addition to the liquid wastes there are waste gases containing toxic components and fumes which without control represent an air pollution problem as well as a hazard to plant workers. At the present time there is a need for more efficient, cost effective methods for the destruction of harzardous/toxic organic wastes. Present technologies, typically based on incineration, are not only costly but even more important are not completely reliable and typically do not achieve complete destruction, leading to proposals for burning at sea. Combustion of halogenated hydrocarbons is especially a problem since such compounds tend to inhibit combustion and reduce flame speeds. Thus, with highly toxic compounds such as polychlorinated biphenyl's (PCB's) combustion can be hazardous. For compounds such as chlorinated dioxine, 99.9999 percent or better conversion efficiency is required.

LIQUID WASTES

Conventional thermal incinerators for hazardous or toxic organic liquids, whether utilizing conventional flame combustors or fluidized bed combustors, require relatively long residence times to achieve acceptable high destruction efficiencies, typically on the order of one to five seconds. Such combustors typically require a high degree of turbulent backmixing to maintain combustion. It is believed that the long mean residence time required for high conversion stems from the fact that extensive backmixing results in a wide range of fluid residence times. Thus, even with a relatively long mean residence time some flow elements pass through very quickly and essentially uncombusted. Moreover, in the case of flame combustors, soot formation can entrap organics increasing burn-out time.

Flame combustors require substantial back mixing to achieve flame stability since laminar flame speeds are typically too low to permit high heat release rates without backmixing. In the fluidized bed systems combustion is stabilized by turbulence in both the gas and solid phases. The solid particles can create a dust pollution problem even with good filters since the finest dust particles are the greatest health hazard. Therefore, fluidized be units are disadvantageous for liquid wastes and are best suited for handling sludges and shredded solids.

The relatively long residence times required by present technologies lead to a need for relatively large incinerators involving high capital costs and significant heat losses. The large capital investment required can be justified only by large waste volumes. Consequently on-site incinerators are economic only for the largest waste producers leading to the need for collection and transportation of wastes, often through areas of high population density, which the near certainty of spills and even major catastrophe. Moreover, although incinerators are designed for better than 99.99 percent conversions, flame-outs of conventional combustors is not uncommon and in incinerators could be disasterous. Even without upsets there has been concern about unacceptable emissions of dioxins from incinerators. This inherent unreliability of conventional incinerators has led to the building of special incinerator ships for burning wastes at sea.

In contrast to the foregoing, the present invention provides for stable combustion and 99.9999 percent or better conversion at plug flow residence times of less than 25 or 50 milliseconds. Thus, capital costs and heat losses are much lower for a given through-put.

Fumes

Unlike liquid or solid wastes, fumes must be controlled on-site. Obviously, prevention of escape of fumes into the air is a prerequisite of good plant design. Nevertheless, provision for isolation and abatement of escaped fumes is essential. Although conversion levels as low as 99 percent or less may often be acceptable in fume abatement of low concentration fumes, conversion levels of 99.99 percent or better are usually desirable. More important than the conversion level is the fume concentration in the effluent. Concentrations of about 100 parts per billion or less, and for some materials even as low as one to two part per billion, are desirable. As with liquid wastes, incineration may be used to oxidize organics to carbon dioxide and water. The choice is between thermal incineration which requires heating the fume-laden air to a high temperature, typically well in excess of 1100° K., and incineration by catalytic oxidation, a process which is feasible even at temperatures as low as 600° K. and can achieve destruction efficiencies of about 99 percent or more. Either choice requires a substantial capital investment. However, fuel costs, and thus operating costs are much higher for thermal incineration because of the required high operating temperatures. Catalytic oxidation on the other hand is less reliable because of catalyst deterioration and the ever present danger of inadvertant catalyst poisoning at the modest operating temperatures employed. An alternate choice is abatement by adsorption, as for example the simple charcoal recirculating range hoods. Such units can be effective but are expensive to operate, requiring replacement or regeneration of the adsorbant prior to breakthrough.

The method of the present invention permits reliable, cost effective, on-site destruction of fumes as well as of hazardous/toxic waste liquids.

SUMMARY OF THE INVENTION

Definition of Terms

The term "carbonaceous waste" as used herein refers to carbon containing compounds such as hydroarbons, dioxine, alcohols, ketones, aldehydes, ethers, organic acids, halogenated forms of the foregoing organic compounds and the like. The waste may be gaseous, liquid or solid at normal temperature and pressure.

The terms "fume" and "fumes" in the present invention refers to admixtures of organic vapors with air or inert gases in too low a concentration to produce a flame, and typically in concentrations as low as one to several hundred parts per million by volume. Although the invention is described herein in terms of air as the oxident, it is well understood that oxygen is the required element to support combustion. The term "air" is used herein to refer not only to atmospheric air but to oxygen containing non-fuel components of admixtures, including water added to enhance combustion.

The term "instantaneous auto-ignition temperature" for a fuel-air admixture as used herein is defined to mean that temperature at which the auto-ignition lag of the fuel-air mixture entering the combustion zone is negligible relative to the residence time in the combustion zone of the mixture undergoing combustion.

As used in the present invention, the term "fuel" includes conventional fuels as well as both the carbonaceous waste liquids and vapors to be destroyed and any supplemental fuel required to obtain fuel-air admixtures with sufficiently high adiabatic flame temperatures. With gaseous or liquid wastes of sufficient heating value the waste stream can be the sole fuel used. With very low heating value waste streams, as for example low concentration fumes or high water content oil-water emulsions, a supplementary fuel is typically required.

The term "essentially complete combustion" is used to denote a level of conversion meeting the requirements for disposal of hazardous and toxic wastes. Thus, conversion levels greater than 99.99 percent (for chlorinated dioxine 99.9999 percent) are required. For fumes the requirement may be stated in terms of concentration of the fume in the effluent, typically less than 0.1 ppm but often as low as one to five parts per billion. Soot free combustion is essential. These converstion levels are well beyond those required for primary fuel combustion for boilers and gas turbines.

In the present invention, the "stoichiometric amount of air" means the amount of air required to provide sufficient oxygen for complete conversion of the fuel to carbon dioxide and water.

The term "plug flow" as used herein should be understood to mean flow systems with a narrow residence time distribution without significant backmixing in the plug flow combustion zone.

DETAILED DESCRIPTION OF THE INVENTION

In accordance with the present invention, hazardous waste streams are destroyed and the heating value recovered by combustion of an admixture of fuel and air in a plug flow reaction zone at a temperature in excess of 1350° K. and at a velocity in excess of the laminar flame velocity of the fuels used. A preferred method of stabilizing plug flow combustion is by use of a catalyst as in the method of my U.S. Pat. No. 3,928,961, incorporated herein by reference thereto. Other methods include plasma jet stabilization, thermal stabilization by contact with a hot wall or stabilization by heating at least a portion of the admixture of fuel and air to a temperature above or close to the instantaneous auto-ignition temperature by mixing with hot combustion products in a venturi mixing zone prior to the plug flow reaction zone. As noted above, at the instantaneous auto-ignition temperature, auto-ignition delay is negligible and combustion proceeds rapidly. Using a venturi to recycle hot combustion products is particularly effective with high water content fuels. For complete combustion of the fuel at least a stoichiometric amount of air is required. At least twice the stoichiometric amount of air is preferred. In gas turbine applications the excess air may be greater than 400 percent.

The catalytically stabilized thermal combustor of the aforementioned patent is especially well suited for the plug flow combustor of the present invention since it represents a unique approach to combustion that incorporates the best features of thermal flame combustors and heterogeneous catalytic surface oxidation systems. Moreover, even fuel-air mixtures well below the normal lean flammability limits are readily burned. In the catalytically stabilized thermal combustor, it is believed that catalytic surface reactions generate heat and gas phase free radicals which promote rapid boundary gas phase combustion. The result is an efficient, high heat release rate combustor which is remarkably insensitive to flow surges. As a primary fuel combustor, the catalytically stabilized thermal combustor typically achieves conversions above 99.9 percent with no soot formation, far better than the typical flame combustor. Using the methods of the present invention higher conversion efficiencies can be reliably obtained and are essential for the effective destruction of toxic wastes.

It has now been found that the conversion efficiency of a catalytically stabilized thermal combustor is limited by the passage of uncombusted fuel through less active flow channels, primarily the cooler outer channels. In the method of the present invention these cooler outer channels are advantageously blocked to provide insulation for the inner channels. Although not necessary in primary combustion systems, it has been found that the better than 99.9999 percent conversion of combustible organics required for a PCB waste oil burning system can be obtained in a catalytically stabilized combustor provided radial heat losses are controlled such that the coolest reaction channels are maintained above a predetermined temperature, typically above about 1300° K. and more preferably above 1350° K. This is to ensure that the actual flame temperature reached in these coolest channels is at least as high as 1350° K. The adiabatic flame temperature of the incoming fuel-air admixture is maintained at a value sufficiently higher than 1350° K. to maintain the desired actual flame temperature. Similarly high conversions can be obtained with hot gas or plasma-jet stabilized and thermally stabilized plug flow reactor combustion systems provided the reactor internal wall surfaces are maintained at a sufficiently high temperature to avoid quenching of gas phase combustion at the wall. The adiabatic flame temperature of the incoming admixture of fuel and air preferably is high enough that the actual flame temperature at completion of combustion is at least 1350° K. even near the combustor wall.

Because of the small size of the combustors of the present invention, on-site combustion of most hazardous organics is now feasible, including even chlorinated hydrocarbons. Moreover, combustion systems according to the present invention are well suited for powering gas turbines and thus for recovering energy in the form of work. The method of the present invention is therefore suitable for ultra-clean combustion of conventional fuels in devices such as gas turbines and furnaces. Gas turbines employing the present invention for destruction of hazardous materials can power an electrical generator thus providing a source of electrical power as well as a means of destroying hazardous wastes. Gas turbine systems of the present invention are especially advantageous for treating fumes because of the large air handling capacity inherent in gas turbine systems. In fume abatement applications, it is important that essentially none of the fumes by-pass the cumbustor. Therefore, it is advantageous to use a source of clean compressed air for turbine cooling air rather than part of the combustion air. Alternately, an uncooled turbine or use of an alternate cooling fluid such as steam may be employed.

Inasmuch as liquid wastes are often of varying indeterminate composition (and heat of combustion), particularly in the case of fuel-water emulsions and water soluble liquids containing water, it is necessary for reliable operation to either burn the waste along with another fuel (as in the operation of a furnace) or to utilize a rapid response feedback control system which can automatically compensate for variations in the heating value of the waste liquids. The fuel-air admixtures of the present invention may be obtained in various ways. High heating value process fumes containing suitable concentrations of combustibles and oxygen may be used as supplied. With most fumes of organic vapors in air, admixtures of sufficient heating value are formed by forming an intimate admixture with additional fuel. In the case of liquid wastes or high heating value gaseous wastes, suitable intimate admixtures may be formed by injecting the waste stream into air. With especially toxic wastes such as highly chlorinated substances, it is advantageous to utilize fuel-air admixtures containing at least about 0.5 mole of water per mole of carbon to enhance combustion efficiency even further. With gas turbines employing combustors according to the present invention, suitable admixtures can be formed by feeding the fuel into the turbine compressor inlet along with the inlet air. This is especially advantageous for gaseous fuels such as high heating value gaseous wastes.

PCB contaminated hydrocarbon oils are readily combusted. However, although pure halogenated hydrocarbons can be burned, it is advantageous to burn such oils in combination with at least about 25 percent by weight of a hydrocarbon fuel to achieve more efficient combustion and to produce hydrochloric acid in the effluent rather than chlorine. Alternately, it is advantageous to introduce water, preferably one mole per mole of chlorine, into the fuel-air admixture to enhance combustion and as a source of hydrogen for conversion of chlorine to hydrogen chloride (hydrochloric acid). Hydrochloric acid and other inorganic contaminants present in the combustion effluent may be removed by either hot or cold scrubbing using conventional means.

The present invention is further described in connection with the following drawings.

Figure 1:
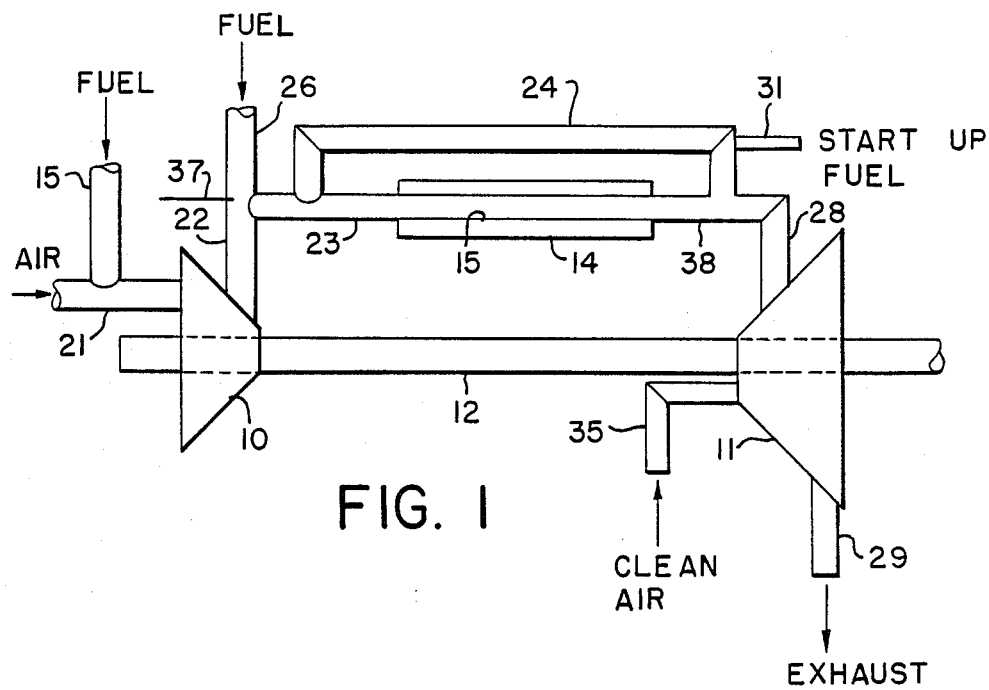
FIG. 1 is a schematic representation of a gas turbine system employing a recycle gas stabilized thermal combustor according to the method of the present invention.

With reference to FIG. 1, power shaft 12 carries an air compressor 10 and power turbine 11. Power shaft 12 can be connected to any suitable power transmission system for use of the net power imparted to the shaft by turbine 11, as for example an electrical generator. For waste disposal operation, the turbine is advantageously operated at full load and the full electrical output fed into the electrical system with excess power not utilized fed back to the power grid. The structural operation and control of gas turbine systems are well known in the art and details in this regard are omitted this description as they are unnecessary for explanation of the present invention. It is noted however that regenerative gas turbines generally have pressure ratios of about 3:1 to 6:1 and simple cycle gas turbines have a pressure ratio of at least about 4:1 and more typically at least about 10:1. Although the system of FIG. 1 is described in terms of simple cycle gas turbine to allow a more understandable drawing, a regenerative or recouperative gas turbine is advantageous in many applications.

Air, typically containing fumes, is fed to the compressor 16 through duct 21 wherein fuel from line 25 is admixed with the entering air. Fuel may be in liquid or gaseous form and is admixed in an amount such that the adiabatic flame temperature of the fuel-air admixture entering the combustion zone is at least about 1600° K. and more preferably at least about 1700° K. If a regenerative or recuperative gas turbine is used, the temperature of the fuel-air admixture may be high enough so that the adiabatic flame temperature of the fuel-air admixture can be as low as about 1400 or 1500° K. Compressor 10 increases the pressure and the temperature of the entering admixture and assists vaporization of any liquid fuel.

Line 22 delivers the gaseous admixture from compressor 10 to venturi 23 wherein it is admixed with a sufficient quantity of combustion products delivered (recycled) via high temperature transfer line 24 such that the temperature of the resulting admixture is above the instantaneous autoignition temperature and then fed to plug flow combustor 14. Combustor 14 is thermally insulated and typically includes a ceramic insulating liner or coating 15. Clean hot combustion product effluent from plug flow thermal combustor 14 is delivered to power turbine 11 via line 28. A portion of the hot effluent from combustor 14 is drawn from line 28 by venturi 23 through line 24. Thermocouples 37 and 38 are positioned in lines 22 and 28 to measure the temperature of the gases leaing compressor 10 and combustor 14. The hot combustion products delivered to turbine 11 via line 28 are expanded in the usual manner to rotate the turbine and exhausted through line 29 thus imparting power to shaft 12 supplying not only the net output power but the power needed to drive compressor 10. If hydrochloric acid is present in the combustion gases it may be removed by hot scrubbing with a solid absorbant prior to expansion in the turbine.

At start-up, a conventional hydrocarbon fuel is burned in burner-igniter 31 which operates until the temperature is combustor 14 is high enough to sustain efficient combustion. When the temperature of combustor 14 is high enough as indicated by thermocouple 38, fuel is admitted through line 25 and fuel flow increased replacing fuel to burner 31. During the start-up period no toxic fumes are utilized and no hazardous wastes are utilized as fuel. After stable operation is established, hazardous wastes may be gradually substituted for all or part of the fuel and toxic fumes admitted as part or all of the inlet air. Clean compressed cooling air is supplied via line 35 inasmuch as use of compressed gases from compressor 10 would result in fuel by-passing the combustion zone. If no significant fumes are present in the inlet air, injection of fuel through alternate fuel line 26 rather than through fuel line 25 will allow use of compressed air from compressor 10 for cooling air in the manner usual with gas turbine systems.

Figure 2:
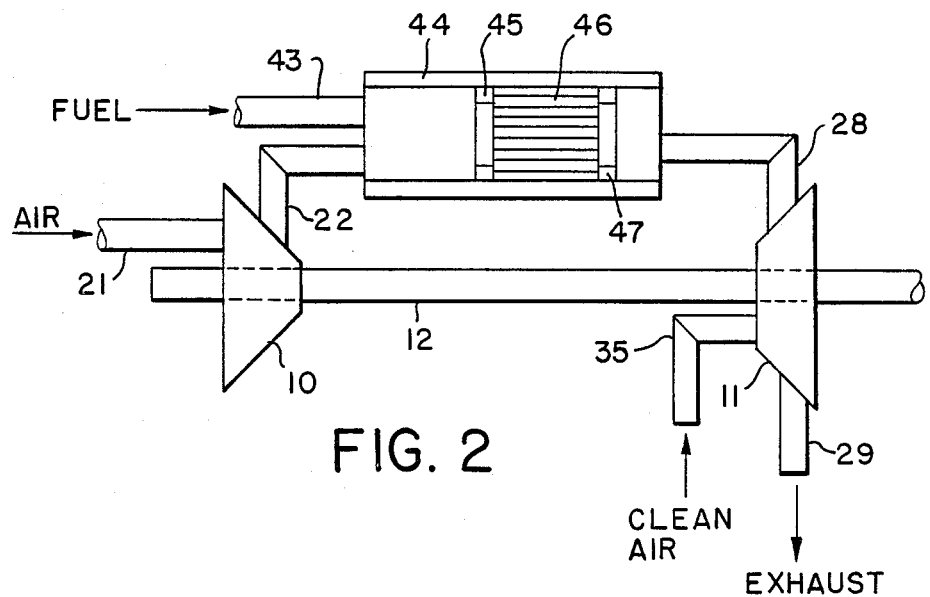
FIG. 2 is a schematic representation of a gas turbine system employing a catalytically stabilized thermal combustor according to the method of the present invention.

In the embodiment of the invention shown in FIG. 2, combustion is stabilized by use of a combustion catalyst. Inlet air enters compressor 10 through duct 21 and compressed air is delivered from compressor 10 to combustor 44 by line 22. Fuel enters combustor 44 via line 43 and is admixed with air from 22 in the entrance region of combustor 44 and passes through combustor catalyst 46 resulting in essentially complete combustion of the fuel. Typically, the entrance region is longer than monolithic combustor catalyst 46. The combustion products leaving combustor 44 via line 28 are delivered to turbine 11 and after expansion to rotate turbine 11, powering shaft 12 as in the system of FIG. 1, exit via line 29. The combustion catalysts of U.S. Pat. No. 3,928,961 are useful in the present invention and may be supported on either metal or ceramic honeycomb type monoliths. However, the system of FIG. 2 is described in terms of a metal honeycomb catalyst because of the greater ease of obtaining an excellent seal against unconverted fuel-air admixture by-passing the catalyst. Metal monolith combustion catalyst 46 is fastened, preferably by welding, to seal ring 45 such as to block off the flow channels in the cooler outer eight millimeters to prevent flow through these channels and thus by-passing of unreacted fuel. These blocked off channels help insulate the inner channels of catalyst 46 against heat loss. Seal ring 45 is in turn welded to the wall of combustor 44 to prevent by-passing of reactants around catalyst 46. Seal ring 45 is slightly larger in diameter than catalyst 46 so that catalyst 46 does not contact the combustor wall thus providing an additional gas film insulation layer. Retaining ring 47 assures that catalyst 46 cannot move downstream and incorporates spacers to hold the downstream end of catalyst 46 away from the wall of combustor 44. Line 35 is provided to provide clean cooling air for turbine 11 and is used when the inlet air contains fumes.

Figure 3:
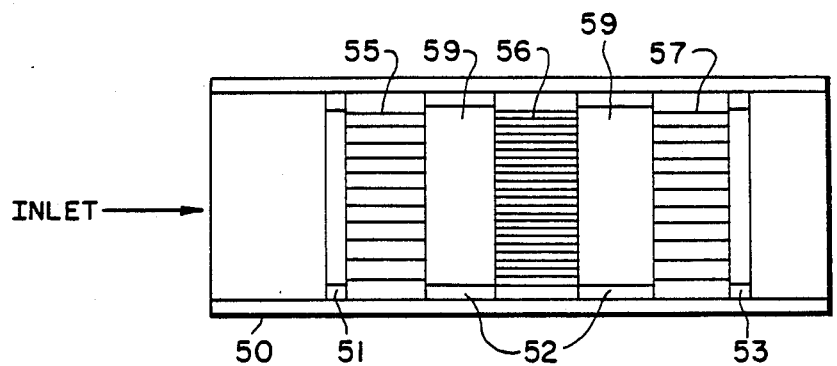
FIG. 3 is a schematic representation of a segmented catalyst bed combustor for use in the method of the present invention.

FIG. 3 depicts a combustor employing a three segment catalyst bed. Honeycomb combustion catalysts 55, 56, and 57 are spaced apart by spacer rings 52. Spacer rings 52 and retainer rings 51 and 53 are welded to combustor can 50 to hold catalysts 55, 56, and 57 in place and to prevent by-passing of the catalysts. Mixing zones 59 assure that any unreacted fuel passing through an inactive channel will be combusted. Although a three or four segment bed is preferred, even a two segment catalyst bed offers improved performance over a single segment bed. Use of segmented beds is particularly important with ceramic honeycomb monolith catalysts because of the difficulty in assuring uniform catalyst coating in every flow channel. Metal monolith catalysts are preferred for single segment catalyst beds because the metal structure can be coated with catalyst before forming the honeycomb monolith. Similarly, ceramic monoliths formed from catalytically active ceramic also can avoid the presence of inactive flow channels.

EXAMPLE I

In a combustion system as schematically depicted in FIG. 1, a flow of 400 grams per second of an admixture of toxic wastes with air, at 700° K. and having an adiabaic flame temperature of 1725° K., is admixed with hot combustion gases at a temperature of 1700° K. in sufficient quantity such that the resulting gas stream has a temperature of 1265° K. This hot gas stream is then passed through a plug flow reaction tube of sufficient volume to provide a residence time of 20 milliseconds. Conversion of the toxic waste fuel is greater than 99.9999 percent. Heat is recovered from the hot combustion products by passing the combustion products to a steam boiler.

EXAMPLE II

In a turbine system as schematically depicted in FIG. 2, 360 grams per second of air at 115° K. and containing 40 ppm by volume of benzene is compressed to a pressure of ten atmospheres and intimately admixed with sufficient propane such that the adiabatic flame temperature of the resulting vaporous admixture is 1525° K. This resulting admixture is combusted in a plug flow metal monolith combustion catalyst in a combustor sized such that the residence time of the combusting gases in the catalyst zone is about twenty-five milliseconds. Conversion of benzene and the propane fuel is greater than 99.9999 percent. Hot combustion effluent is passed to a power turbine for recovery of power. Heat is recovered from the turbine exhaust. Clean compressed air is provided for turbine cooling.

What is claimed is:

1. A method for the destruction of fuels of hazardous carbonaceous wastes by the thermal combustion of said wastes comprising
   (a) providing a catalytically stabilized plug flow combustion zone having inner flow channels and peripheral outer flow channels, the outer peripheral channels of which are blocked to thermally insulate the inner channels and prevent by-passing of non-combusted waste therethrough;
   (b) obtaining an intimate admixture of vaporized hazardous carbonaceous wastes and air, said admixture containing at least a stoichiometric amount of air for substantially complete combustion of the wastes;
   (c) passing said admixture to the insulated plug flow combustion zone; and
   (d) effecting sustained and essentially complete combustion of said admixture under essentially adiabatic conditions to destroy said hazardous wastes and to form a heated combustion effluent essentially free of said hazardous wastes; said combustion being characterized by said fuel-air admixture having an adiabatic flame temperature such that each inner flow channel has an actual flame temperature in the combustion zone greater than about 1350° K.

2. The method of claim 1 wherein combustion is stabilized by a combustion catalyst.

3. The method of claim 2 wherein said catalyst comprises a metal honeycomb structure.

4. The method of operating a gas turbine by the thermal combustion of fuels of carbonaceous wastes comprising the steps of
   (a) providing a catalytically stabilized plug flow combustion zone having inner flow channels and peripheral outer flow channels, the outer peripheral channels of which are blocked to thermally insulate the inner channels and to prevent by-passing of non-combusted waste therethrough;

(b) obtaining an intimate admixture of vaporized carbonaceous wastes and air, said admixture containing at least a stoichiometric amount of air;

(c) passing said admixture to the insulated plug flow combustion zone; and (d) effecting sustained and essentially complete combustion of said admixture under essentially adiabatic conditions to destroy said hazardous wastes thereby forming a heated combustion effluent essentially free of said hazardous wastes; said combustion being characterized by said admixture having an adiabatic flame temperature such that each inner flow channel has an actual flame temperature in the combustion zone greater than about; 1350° K.

passing said effluent from said combustion zone through a turbine to rotate said turbine.

5. The method of claim 4 wherein combustion is stabilized by a catalyst.

6. The method of claim 5 wherein said catalyst comprises a metal honeycomb and said honeycomb is sealed against by-passing of gases by attaching said catalyst to a metal seal ring and fastening said seal ring to the combustor wall.

* * * * *

UNITED STATES PATENT AND TRADEMARK OFFICE
CERTIFICATE OF CORRECTION

PATENT NO. : 4,864,811

DATED : September 12, 1989

INVENTOR(S) : William C. Pfefferle

It is certified that error appears in the above-identified patent and that said Letters Patent is hereby corrected as shown below:

Col. 1, line 48; "acceptable" should read -- acceptably -- .
Col. 1, line 68; "be" should read -- bed -- .
Col. 2, line 11; "which" should read -- with -- .
Col. 2, line 39; "part" should read -- parts -- .
Col. 2, line 68; "hydroarbons" should read -- hydrocarbons -- .
Col. 3, line 1; "dioxine" should read -- dioxins -- .
Col. 6, line 11; between the words "omitted" and "this" insert the word -- from -- .

Col. 6, line 49; "leaing" should read -- leaving -- .

Col. 7, line 15; before the numeral "22" insert the word -- line -- .

UNITED STATES PATENT AND TRADEMARK OFFICE
CERTIFICATE OF CORRECTION

PATENT NO. : 4,864,811

DATED : September 12, 1989

INVENTOR(S) : William C. Pfefferle

It is certified that error appears in the above-identified patent and that said Letters Patent is hereby corrected as shown below:

Col. 10, line 5; before the word "passing" insert -- (e) --.

Signed and Sealed this

Third Day of September, 1991

*Attest:*

HARRY F. MANBECK, JR.

*Attesting Officer*  *Commissioner of Patents and Trademarks*